Oct. 3, 1967  A. P. ANDERSON  3,344,780
PORTABLE GRILL DEVICE
Filed Sept. 1, 1965
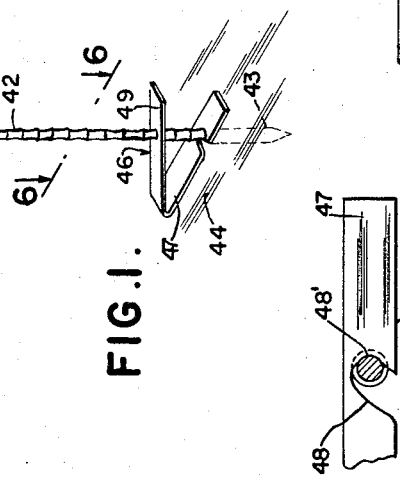
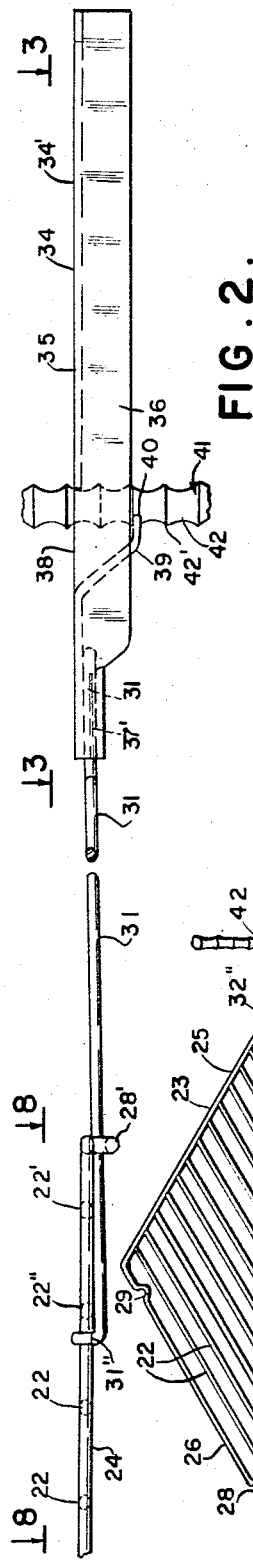
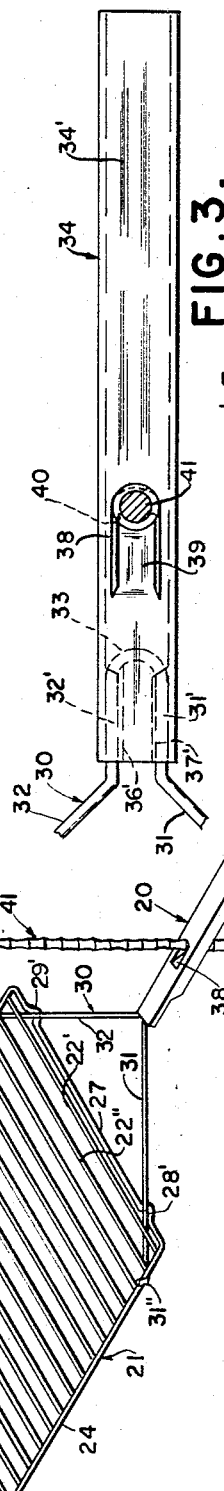
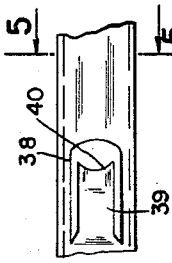
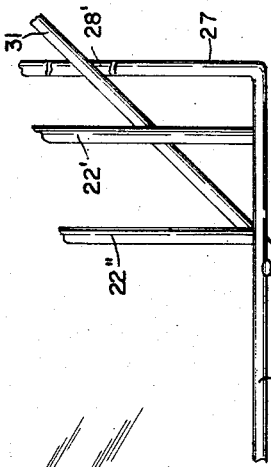
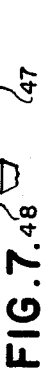
INVENTOR
ARVID P. ANDERSON
BY Robert E. Kleeve
ATTORNEY

United States Patent Office

3,344,780
Patented Oct. 3, 1967

3,344,780
PORTABLE GRILL DEVICE
Arvid P. Anderson, Warwick, N. Dak. 58381
Filed Sept. 1, 1965, Ser. No. 484,271
3 Claims. (Cl. 126—30)

This invention relates to food equipment, more particularly the invention relates to portable barbecue grill equipment.

It is an object of the invention to provide a novel inexpensive barbecue grill and stand which can be easily assembled and manufactured.

It is a further object of the invention to provide a novel barbecue grill having a handle, with the handle adapted to be attached to a stake at selected elevations.

It is a further object of the invention to provide a novel barbecue grill which may be easily and rapidly attached to a stake at adjusted heights.

Further objects and advantages of the invention will become apparent as the description proceeds and when taken in conjunction with the accompanying drawing wherein:

FIGURE 1 is a perspective view of the barbecue invention.

FIGURE 2 is an enlarged fragmentary side elevational view of the grill and handle and a portion of the stake of the invention.

FIGURE 3 is a cross-sectional view taken along line 3—3 of FIGURE 2 and illustrating the top of the handle.

FIGURE 4 is a top view of a portion of the handle, similar to FIGURE 3, with the stake removed.

FIGURE 5 is a cross-sectional view taken along line 5—5 of FIGURE 4.

FIGURE 6 is a cross-sectional view taken along line 6—6 of FIGURE 1, and illustrating a top view of the stabilizing member and stake.

FIGURE 7 is a side elevational view of the stabilizing member and stake.

FIGURE 8 is a fragmentary view of the grill and arms of the handle taken along line 8—8 of FIGURE 2.

FIGURE 9 is a cross-sectional view taken along line 9—9 of FIGURE 7.

Briefly stated, the invention comprises a barbecue grill, a handle having diverging arms, said arms at its forward end being detachably connected to said grill, a stake having a series of annular recesses along its length, said handle having an opening at its forward end with a projecting tongue adjacent said opening, said handle being adapted to be slid over said stake and suspended on said stake by engagement of said tongue and opposing edges of said handle opening in said recesses at a selected height on said stake, a V-shaped stabilizer member near the bottom of said stake adapted to engage the surface of the ground to stabilize said stake in an upright position.

Referring more particularly to the drawing, in FIGURE 1 the barbecue grill invention 20 is illustrated in its assembled operative position.

The barbecue invention 20 has a grill 21. The grill 21 has a plurality of ribs 22, with a rectangular rod member 23. The rod member 23 is formed of two opposing sides 24 and 25, to which the opposite ends of the ribs 22 are welded or fixed. The rod member 23 is also formed of two laterally opposing sides 26 and 27 connected to sides 24 and 25 at their opposite ends. The sides 26 and 27 each has a pair of V-shaped downwardly projecting notches 28 and 29, and 28' and 29' respectively, which serve as legs for the grill.

A resilient steel rod member 30 includes a pair of diverging arms 31 and 32, which extend outward from one another at approximately a 90 degree angle to one another. The arms have relatively short parallel portions 31' and 32' at their inner ends, with a reversely curved apex portion 33, which forms an integral connection between the portions 31' and 32'. The outer ends of the arms 31 and 32 have portions resting in the V-shaped notches 28' and 29' and pass under ribs 22' and 22" and have upward projecting end rod portions 31" and 32" which project upward along the outside of the sides 24 and 25, respectively and project a slight distance above the horizontal top edge of sides 24 and 25, and may bend inwardly over the top edge slightly to thereby attach the arms 31 and 32 to the grill member 21, as illustrated in FIGURES 1, 2, and 8.

The spring arms are formed at less than a 90 degree angle to one another and are of spring steel so that when they are attached to the grill in the manner illustrated in FIGURES 1, 2, and 8, the arms 31 and 32 will urge toward one another and against the sides 24 and 25 to additionally secure the arms 31 and 32 to the grill 21.

The handle 34 has an inverted U-shaped channel construction, with a top face portion 35 and a pair of depending sides 36 and 37. At the forward end of the handle 34, the portions 36' and 37' of the sides are folded in and partially around the inner ends 31' and 32' of the arms to secure the arms to the handle 34. The handle has a cut out opening 38 in the top face 35 with a tongue member 39 formed integrally with top face which tongue 39 is bent down and rearward with a forked portion 40 at its outer end.

The stake 41 is made of conventional concrete reinforcing rod and has a plurality of evenly spaced annular recesses 42 along its length, with a pointed lower end 43 adapted to be inserted into the ground 44 as illustrated in FIGURE 1.

The handle 34 is mounted to the stake by the operator grasping the back portion 34' of the handle 34 and pivoting the handle clockwise slightly from its position illustrated in FIGURE 2 and sliding the handle, while in its relative position, down over the stake 41 through the cut out opening 38. The handle will be slid downward to a selected height on the stake and will be pivoted counterclockwise back to its position illustrated in FIGURE 2 thereby locking the handle to the stake at that height, so that a fire on the ground beneath the grill 21 can cook or barbecue food placed on the grill 21.

By the stake having a plurality of annular recesses 42, the handle may be securely held to the stake 41 at any selected height, as illustrated in FIGURES 1, 2, and 3, by the forked end 40 of the tongue of the handle engaging one of the annular recesses 42, and the curved edge 45 of the cut out opening 38 of the handle engaging another of the recesses 42, from the opposite side.

The weight and leverage force of the grill and arms and handle portion on the one side of the stake 41 will exceed the weight and leverage force of the handle portion 34' on the opposite side of the stake, consequently, the grill, arms and handle portion on the one side will tend to pivot counterclockwise downward about the axis of the stake 41, (when viewed from FIGURE 2) and thereby the handle 34 will be maintained locked to the stake as illustrated in FIGURES 2 and 3.

To remove the grill and arms and handle from the stake, the operator will merely pivot the handle, slightly clockwise slightly from its position illustrated in FIGURE 2 while grasping the handle and will then slide the handle upward and off the stake.

A V-shaped stabilizer member 46 is attached to the stake 41 near the bottom of the stake, with one leg 47 resting flush with the ground 44 and having a cut out opening 48 in leg 47 encircling the stake at one of the recesses 42. The other leg 49 has a slightly oversized bore 50, in relation to the stake, and the stake passes through the bore. The V-shaped member 46 is made of spring steel with the legs 47 and 48 urging outward from their position as illustrated in FIGURES 1 and 7, to thereby lock the stabilizer to the stake.

The cut out opening 48 in the leg 47 by communicating with the side edge 47' of the leg 47, enables the stabilizer to be adapted to different heights more readily by pivoting the stabilizer laterally of the length of the stake, to remove the leg 47 from the stake and thereafter sliding the stabilizer up or down on the stake and reengaging the leg 47 to its position shown in FIGURES 1, 7, and 9.

The stabilizer will lock in its position shown in FIGURE 7 by the back edges 48' and 50' of the opening 48 and 50 engaging the recesses 42, between the ridges 42'.

The stabilizer will also be assistance in introducing the stake into the ground, as the operator may place his foot on the leg 47 at the outer end 47' and press down to force the pointed end 43 of the stake into the ground.

Thus it will be seen that a novel, inexpensive portable barbecue grill and stand invention has been provided, which can be rapidly assembled and easily stored since the grill and arms may be rapidly detached and the stabilizer easily detached for storage and shipping, and the handle, and arms may be attached to the grill and the stabilizer attached to the stake rapidly and without welding.

Also the grill may be easily operated by the operation of simply grasping the handle 34 to attach the grill to the stake as well as to remove the grill from the stake, and also the operator may use the handle to carry the grill about from place to place.

It will be obvious that various changes and departures from the invention may be made without departing from the spirit and scope thereof and accordingly it is not intended that the invention be limited to that specifically described in the specification or illustrated in the drawing but only as set forth in the appended claims wherein what is claimed is:

1. A barbecue grill device comprising a grill member, an elongated handle, a pair of resilient metal arms diverging outward and having their outer ends hooked to said grill with their inner ends attached to said handle, said grill having V-shaped grooves which cooperate to hook said arms to said grill, said handle having an inversely channel shaped cross-section with a cut out opening portion and a projecting tongue along its forward end, an elongated stake having a plurality of annular recesses along its length and adapted to be inserted into the ground, said handle being adapted to be slid over said stake with said tongue and cut out portion of said handle adapted to engage the recesses in said stake from opposite sides to secure said handle to said stake at a selected height, a resilient metal V-shaped stabilizer plate having apertures in each leg with said plate adapted to be slid over said stake, with the plate apertures engaging said stake.

2. A cooking device comprising a grill, an elongated handle having arms diverging outward from said handle and detachably hooked to said grill, said handle having a cut out portion along its forward end with a projecting tongue adjacent said forward end, a stake having a plurality of outwardly projecting annular ribs along its length forming a plurality of recesses along its length, said handle adapted to be slid over said stake with said tongue and cut out portion engaging said ribs of said stake in the recesses of said stake from opposite sides and cooperating with said ribs of said stake to detachably lock said handle to said stake in generally perpendicular relation.

3. A cooking device comprising a grill, a handle attached to said grill, said handle having a projecting tongue and a cut out with the edges forming an opening, an opening along its forward end, said stake having a plurality of annular ribs along its length projecting outwardly and forming recesses therebetween and adapted to have its lower end inserted into the ground, said handle being adapted to receive said stake in said opening with said tongue and cut out edges of said handle engaging said ribs of said stake in said recesses to detachably lock said handle to said stake at a selected height.

References Cited
UNITED STATES PATENTS

| | | | |
|---|---|---|---|
| 1,014,393 | 1/1912 | Hermann | 248—125 X |
| 1,423,612 | 7/1922 | Jewett | 126—30 X |
| 2,173,024 | 9/1939 | Park | 126—30 |
| 2,642,744 | 6/1953 | Thomas | 73—429 |
| 2,851,823 | 9/1958 | Peterson | 47—47 |
| 2,977,953 | 4/1961 | Dowdy | 126—30 |
| 2,998,001 | 8/1961 | Lofgren et al. | 126—30 X |
| 3,108,828 | 10/1963 | Kus | 248—125 X |
| 3,195,531 | 7/1965 | Groff | 126—30 |

FREDERICK KETTERER, *Primary Examiner.*